United States Patent
Flosdorf et al.

(10) Patent No.: US 8,437,505 B2
(45) Date of Patent: May 7, 2013

(54) DETECTION OF LOCAL MOTION BETWEEN IMAGE FRAMES

(75) Inventors: Stephen P. Flosdorf, Round Rock, TX (US); Michael V. Jenkins, Buda, TX (US)

(73) Assignee: LifeSize Communications, Inc., Austin, TX (US)

( * ) Notice: Subject to any disclaimer, the term of this patent is extended or adjusted under 35 U.S.C. 154(b) by 675 days.

(21) Appl. No.: 12/640,450

(22) Filed: Dec. 17, 2009

(65) Prior Publication Data

US 2011/0150287 A1   Jun. 23, 2011

(51) Int. Cl.
 *G06K 9/00* (2006.01)
(52) U.S. Cl.
 USPC .......................................................... 382/103
(58) Field of Classification Search .................. None
 See application file for complete search history.

(56) References Cited

U.S. PATENT DOCUMENTS

| | | | |
|---|---|---|---|
| 4,901,145 A | 2/1990 | Harradine et al. | |
| 5,519,456 A | 5/1996 | Inamori | |
| 5,617,144 A | 4/1997 | Lee | |
| 5,731,832 A | 3/1998 | Ng | |
| 5,793,435 A | 8/1998 | Ward et al. | |
| 6,157,677 A | 12/2000 | Martens et al. | |
| 6,493,041 B1 | 12/2002 | Hanko et al. | |
| 6,760,378 B1 | 7/2004 | Conklin | |
| 7,016,415 B2 | 3/2006 | Alvarez | |
| 7,034,892 B2 | 4/2006 | Ojo et al. | |
| 7,050,501 B2 | 5/2006 | Alvarez | |
| 7,269,220 B2 | 9/2007 | Alvarez | |
| 7,408,986 B2 | 8/2008 | Winder | |
| 7,440,589 B2 * | 10/2008 | Garoutte | 382/103 |
| 7,558,320 B2 | 7/2009 | Winder | |
| 7,831,063 B2 * | 11/2010 | Laughlin | 382/103 |
| 8,189,873 B2 | 5/2012 | Chen | |
| 2007/0058837 A1 * | 3/2007 | Boregowda et al. | 382/103 |

* cited by examiner

*Primary Examiner* — Claire X Wang
(74) *Attorney, Agent, or Firm* — Meyertons Hood Kivlin Kowert & Goetzel, P.C.; Jeffrey C. Hood (57) ABSTRACT

A system and method for detecting local motion between image frames are presented. Each image frame may include a plurality of pixels. A first image frame and a second image frame may be received. Values of a first plurality of pixels at first pixel locations of the first image frame may be read. Values of a second plurality of pixels at second pixel locations of the second image frame may be read. The first pixel locations of the first image frame may correspond to the second pixel locations of the second image frame. A first delta function, based on differences between pixel values between the first and second image frames, may be calculated to produce a first output. The first output may be compared to a first one or more thresholds. It may be determined whether local motion has occurred in the second image frame based on said comparing.

24 Claims, 5 Drawing Sheets

|  |  |  |  |  |  |  |
|---|---|---|---|---|---|---|
| $P_F^{-1}(-3,-3)$ 302 | $P_F^{-1}(-3,-2)$ | $P_F^{-1}(-3,-1)$ | $P_F^{-1}(-3,0)$ | $P_F^{-1}(-3,1)$ | $P_F^{-1}(-3,2)$ | $P_F^{-1}(-3,3)$ |
| $P_F^{-1}(-2,-3)$ | $P_F^{-1}(-2,-2)$ | $P_F^{-1}(-2,-1)$ | $P_F^{-1}(-2,0)$ | $P_F^{-1}(-2,1)$ | $P_F^{-1}(-2,2)$ | $P_F^{-1}(-2,3)$ |
| $P_F^{-1}(-1,-3)$ | $P_F^{-1}(-1,-2)$ | $P_F^{-1}(-1,-1)$ | $P_F^{-1}(-1,0)$ | $P_F^{-1}(-1,1)$ | $P_F^{-1}(-1,2)$ | $P_F^{-1}(-1,3)$ |
| $P_F^{-1}(0,-3)$ | $P_F^{-1}(0,-2)$ | $P_F^{-1}(0,-1)$ | $P_F^{-1}(0,0)$ 300 | $P_F^{-1}(0,1)$ | $P_F^{-1}(0,2)$ | $P_F^{-1}(0,3)$ |
| $P_F^{-1}(1,-3)$ | $P_F^{-1}(1,-2)$ | $P_F^{-1}(1,-1)$ | $P_F^{-1}(1,0)$ | $P_F^{-1}(1,1)$ | $P_F^{-1}(1,2)$ | $P_F^{-1}(1,3)$ |
| $P_F^{-1}(2,-3)$ | $P_F^{-1}(2,-2)$ | $P_F^{-1}(2,-1)$ | $P_F^{-1}(2,0)$ | $P_F^{-1}(2,1)$ | $P_F^{-1}(2,2)$ | $P_F^{-1}(2,3)$ |
| $P_F^{-1}(3,-3)$ | $P_F^{-1}(3,-2)$ | $P_F^{-1}(3,-1)$ | $P_F^{-1}(3,0)$ | $P_F^{-1}(3,1)$ | $P_F^{-1}(3,2)$ | $P_F^{-1}(3,3)$ |

FIG. 3A

| $P_{F0}(-3,-3)$ 352 | $P_{F0}(-3,-2)$ | $P_{F0}(-3,-1)$ | $P_{F0}(-3,0)$ | $P_{F0}(-3,1)$ | $P_{F0}(-3,2)$ | $P_{F0}(-3,3)$ |
|---|---|---|---|---|---|---|
| $P_{F0}(-2,-3)$ | $P_{F0}(-2,-2)$ | $P_{F0}(-2,-1)$ | $P_{F0}(-2,0)$ | $P_{F0}(-2,1)$ | $P_{F0}(-2,2)$ | $P_{F0}(-2,3)$ |
| $P_{F0}(-1,-3)$ | $P_{F0}(-1,-2)$ | $P_{F0}(-1,-1)$ | $P_{F0}(-1,0)$ | $P_{F0}(-1,1)$ | $P_{F0}(-1,2)$ | $P_{F0}(-1,3)$ |
| $P_{F0}(0,-3)$ | $P_{F0}(0,-2)$ | $P_{F0}(0,-1)$ | $P_{F0}(0,0)$ 350 | $P_{F0}(0,1)$ | $P_{F0}(0,2)$ | $P_{F0}(0,3)$ |
| $P_{F0}(1,-3)$ | $P_{F0}(1,-2)$ | $P_{F0}(1,-1)$ | $P_{F0}(1,0)$ | $P_{F0}(1,1)$ | $P_{F0}(1,2)$ | $P_{F0}(1,3)$ |
| $P_{F0}(2,-3)$ | $P_{F0}(2,-2)$ | $P_{F0}(2,-1)$ | $P_{F0}(2,0)$ | $P_{F0}(2,1)$ | $P_{F0}(2,2)$ | $P_{F0}(2,3)$ |
| $P_{F0}(3,-3)$ | $P_{F0}(3,-2)$ | $P_{F0}(3,-1)$ | $P_{F0}(3,0)$ | $P_{F0}(3,1)$ | $P_{F0}(3,2)$ | $P_{F0}(3,3)$ |

DETECTION OF LOCAL MOTION BETWEEN IMAGE FRAMES

FIELD OF THE INVENTION

The present invention relates to image processing, and in particular to detection of local motion between image frames.

DESCRIPTION OF THE RELATED ART

The growing fields of digital photography and digital videography typically rely on the use of digital image sensors to detect an image. A digital image sensor typically comprises a field of light sensitive pixel sensors. In any given image sensor, some or all of the pixel sensors may be subject to different degrees of variability in sensitivity. If the image sensor is used to take a series of images, such as a series of image frames for a video stream, this can result in temporal noise between frames.

Typically, for video depicting static scenes, a simple temporal filter may be easily deployed and sufficient to remove most temporal noise. An example of a simple way of applying a temporal filter would be to apply a low pass filter to a particular pixel location in which noise is to be removed. In this case the low pass filter only uses, and is applied to, a pixel value that is at a given spatial location within a video frame in which temporal noise is to be removed.

However, for non-static video, the problem is much more challenging. If a change in pixel value between frames is due to real changes in the scene depicted, applying a temporal filter may cause undesirable artifacts. For example, moving objects might appear to blur, or ghost, on the screen if the low pass filter combines objects that move over an area with objects that are behind the moving objects. Accordingly, improvements in the field of temporal filtering for motion video are desirable.

SUMMARY OF THE INVENTION

Various embodiments are presented of a system and method for detecting local motion between image frames. Embodiments of systems adapted to implement the method may include an input for receiving image frames, and logic coupled to the input, which may be configured to implement the method according to various embodiments.

The method for detecting local motion between image frames may include receiving a first image frame and a second image frame in a series of image frames, where the second image frame is later in time relative to the first image frame. Each image frame may include a plurality of pixels. Values of a first plurality of pixels at first pixel locations of the first image frame may be read. Values of a second plurality of pixels at second pixel locations of the second image frame may be read.

The first pixel locations of the first image frame may correspond to the second pixel locations of the second image frame. For example, the first plurality of pixels may include a first pixel and pixels in a local area centered around the first pixel, while the second plurality of pixels may include a second pixel and pixels in a local area centered around the second pixel. Thus, the location of the first pixel in the first image frame may correspond spatially to the location of the second pixel in the second image frame, and the locations of the pixels in the local areas centered around the first and second pixels may similarly spatially correspond. In other words, the first pixel and the second pixel are at the same position or location for their respective image frames.

A first delta function may be calculated to produce a first output. The first delta function may be based on differences between pixel values of corresponding pixel locations of the first plurality of pixels in the first image frame and the second plurality of pixels in the second image frame. The first output may be compared to a first one or more thresholds. The method may determine if local motion has occurred in the second image frame based on comparing the first output to the first one or more thresholds. Determining if local motion has occurred in the second image frame may include, more specifically, determining if motion has occurred in the local area of the second pixel, e.g., if motion has occurred between the first and second frame in the local areas centered around the first and second pixels.

In some embodiments, the method may also include calculating an intensity of pixel values using pixel values of at least a subset of the second plurality of pixels of the second image frame. The first one or more thresholds may then be determined based on the calculated intensity of pixel values. The calculated intensity of pixel values may be an average intensity, or some other calculated intensity such as a weighted average, of the at least a subset of the second plurality of pixels.

In some embodiments, determining the first one or more thresholds may include comparing a calculated intensity of pixel values to a plurality of predetermined intensity levels. An intensity level range of the at least a subset of the second plurality of pixels of the second image frame may be determined based on the comparison to the plurality of predetermined intensity levels. Each of the plurality of predetermined intensity level ranges may correspond to one or more predetermined thresholds. Determining the first one or more thresholds may thus be based on said comparing; that is, the first one or more thresholds may be the one or more predetermined thresholds which correspond to the determined intensity level range.

Alternatively, in some embodiments, determining the first one or more thresholds may include calculating a mathematical function, which utilizes a calculated intensity of pixel values as an input, and produces the first one or more thresholds as an output.

In some embodiments, the first one or more thresholds may be variable based on a gain of a sensor, e.g., the sensor is used to capture the series of image frames. The first one or more thresholds may also or alternatively be variable based on any other system component that affects the intensity of pixel values.

In some embodiments, the first plurality of pixels may be a subset of the plurality of pixels in the first image frame. Likewise, the second plurality of pixels may be a subset of the plurality of pixels in the second image frame.

In some embodiments, the series of image frames may be a temporally ordered series of video image frames. The first image frame and the second image frame may thus be temporally adjacent in the series of image frames in some embodiments.

In some embodiments, the method may further include calculating one or more additional delta functions to use in determining whether local motion has occurred in the second image frame. For example, in some embodiments, the method may further include reading values of a third plurality of pixels of the first image frame and reading values of a fourth plurality of pixels of the second image frame, where the third pixel locations of the first image frame correspond to the fourth pixel locations of the second image frame. The third plurality of pixels may be a subset of the first plurality of pixels, and the fourth plurality of pixels may likewise be a subset of the second plurality of pixels.

A second delta function may be calculated to produce a second output. The second delta function may be based on differences between pixel values of corresponding pixel locations of the third plurality of pixels in the first image frame and the fourth plurality of pixels in the second image frame. The second output may be compared to a second one or more thresholds. In these embodiments, determining if local motion has occurred in the second image frame may be based on both comparing the output of the first delta function to the first one or more thresholds and comparing the output of the second delta function to the second one or more thresholds.

One example of such an extension of the method is a case where the first (and second) plurality pixels include a 7×7 area where the first (and second) pixels are the central pixel in the area. In this case, the third (and fourth) plurality of pixels might be a 4×4 area whose corners include a corner of the 7×7 area and the first (and second) pixel. In other words, as noted above, the third plurality of pixels may be a subset of the first plurality of pixels, and the fourth plurality of pixels may be a subset of the second plurality of pixels. This example could be further extended to use additional subsets of the first and second pluralities of pixels, such as four overlapping 4×4 areas. Other cases, including other sizes of first/second pluralities of pixels and/or third/fourth pluralities of pixels, are also contemplated.

In some embodiments, determining if local motion has occurred in the second image frame may also be based on whether local motion has occurred in corresponding pixel locations of one or more previous image frames proximate in time to the second image frame. For example, if in a previous image frame (e.g., the first image frame), local motion is detected for one or more pixels in the local area (e.g., the first pixel or one of the pixels in the area centered around the first pixel), this may affect the determination of whether local motion has occurred in the second image frame.

The method may also be extended for use with future frames, in some embodiments. For example, in some embodiments, the method may further include receiving a third image frame in the series of image frames, where the third image frame is later in time relative to the first and second image frames. Values of a fifth plurality of pixels of the third image frame may be read. The locations of the fifth plurality of pixels of the third image frame may correspond to the first and second pixel locations of the first and second image frames. The first delta function may be calculated based on differences between pixel values of corresponding pixel locations in the second plurality of pixels in the second image frame and the fifth plurality of pixels in the third image frame to produce a third output. The third output may be compared to a third one or more thresholds. It may be determined whether local motion has occurred in the third image frame based on comparing the third output to the third one or more thresholds, and in some embodiments, also based on determining if local motion has occurred in the second image frame.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Figure 1:
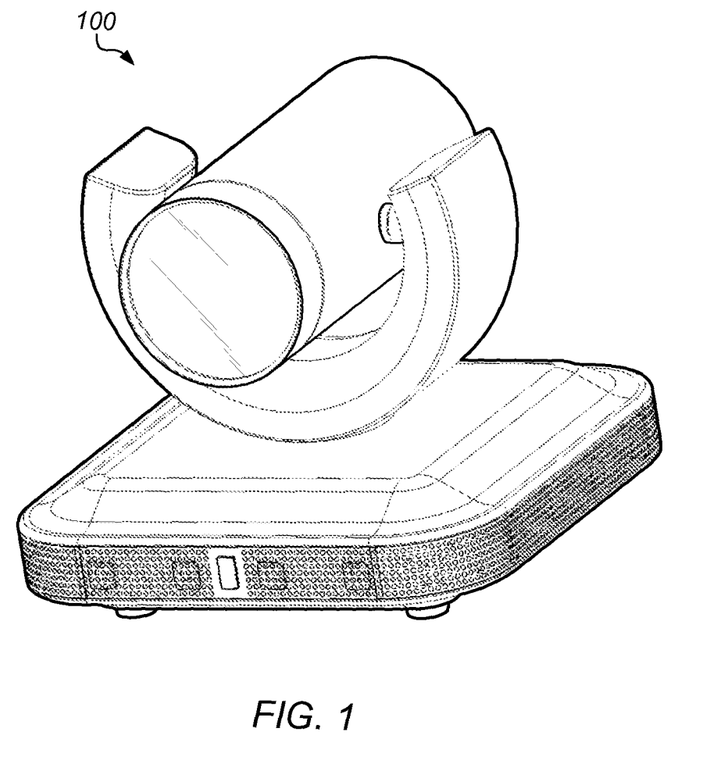
FIG. 1 illustrates an exemplary camera according to one embodiment.

FIG. 1—Camera Including an Image Sensor

FIG. 1 illustrates an exemplary camera 100 according to one embodiment of the present invention. The camera 100 may include a lens and one or more image sensing devices, such as a charge-coupled device (CCD) sensor or a complementary metal-oxide-semiconductor (CMOS) sensor. The camera 100 may be a digital still camera or a digital video camera. The camera 100 may be a high definition (HD) camera or a standard definition camera (SD). In general, the camera 100 may be any sort of camera with at least one image sensor including a plurality of light sensitive pixel sensors, e.g., a digital image sensor.

The image sensor may include pixels sensitive to one or more colors. For example, the image sensor may include pixels laid out in a Bayer pattern, i.e., a square grid with rows of alternating red- and green-light sensitive pixels, alternated with rows of alternating green- and blue-light sensitive pixels. Alternatively, the image sensor may include pixels sensitive to any kind of colors and/or laid out in any geometric pattern; e.g., RGBE, CYGM, monochromatic (grayscale, blue, red, green, etc).

In some embodiments, the camera 100 may include one or more image processing capabilities. For example, the camera 100 may include capabilities for color corrections, e.g., brightness and/or contrast adjustments, white balance adjustments, filtering (e.g., spatial or temporal filtering), and/or other image processing capabilities. Some or all of these capabilities may also depend on various image analysis techniques for detecting conditions or states of image frames, in order to determine how to process an image. For example, according to some embodiments of this disclosure, the camera 100 may include a temporal filter capability, and may utilize a technique for detecting local motion between image frames, such as described in further detail below, as part of determining when and where to perform a temporal filtering operation.

The camera may thus also include a memory and logic for such (and potentially other) image processing functions. The logic may be any kind of logic, including analog logic, digital logic, a processor and memory (such as a CPU, DSP, microcontroller, etc.), an ASIC (application specific integrated circuit), a programmable hardware element, such as an FPGA (field programmable gate array), or any combination of the above. In one embodiment, the image sensor may detect an image, i.e., detect a value (e.g., a luminosity value and/or a chrominance value) for some or all of the light sensitive pixels in the image sensor, which may then be stored in the memory. The logic may be configured to perform a local motion detection algorithm on each pixel of an image frame based on the recorded pixel values for the image and another image (e.g., a prior image in a series of image frames), e.g., as set forth below with respect to FIG. 2 according to various embodiments.

Although in some embodiments the camera may include image processing capabilities such as those described above, it will be noted that image processing functions may also or alternatively be provided by other devices. For example, the camera may couple to a device (such as a video codec, a home computer, or other device), to which it may pass images (e.g., a series of image frames in a video stream) either in real time or at a delay. The device may then perform one or more image processing functions on images received from the camera. In this case, the device may include a memory and logic for image processing functions. As in embodiments of camera 100 which have image processing capabilities, the logic may be any kind of logic, including analog logic, digital logic, a processor and memory (such as a CPU, DSP, microcontroller, etc.), an ASIC (application specific integrated circuit), a programmable hardware element, such as an FPGA (field programmable gate array), or any combination of the above. In a particular set of embodiments, the logic may be configured to perform a local motion detection algorithm on each pixel of an image frame based on the recorded pixel values for the image and another image (e.g., a prior image in a series of image frames), e.g., as set forth below with respect to FIG. 2 according to various embodiments.

Figure 2:
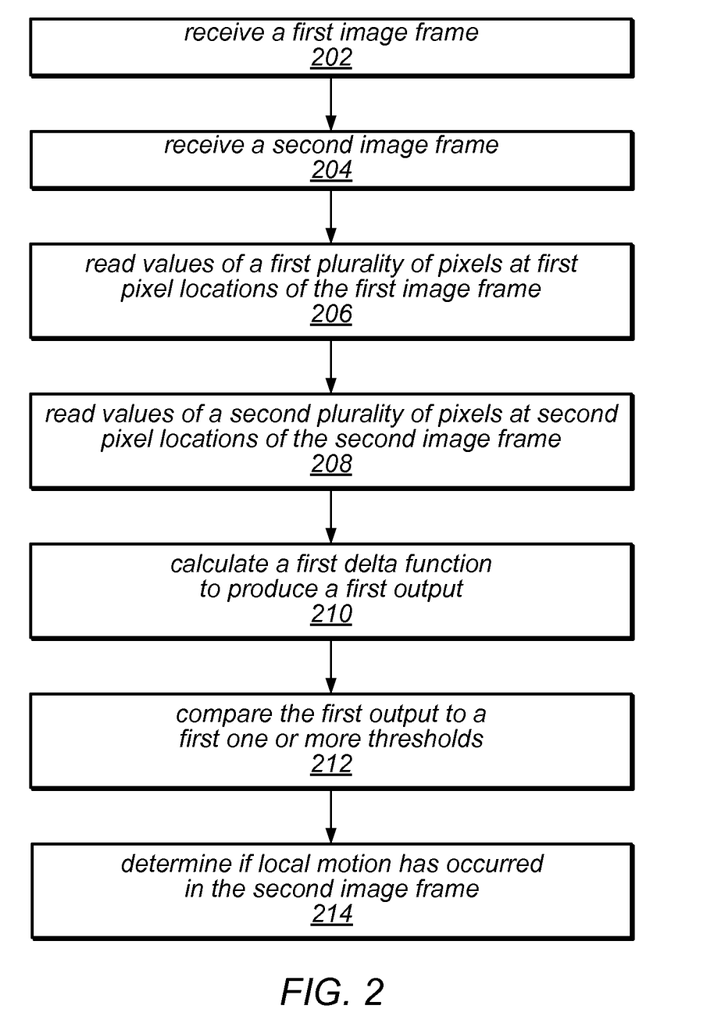
FIG. 2 is a flowchart diagram illustrating a method for detecting local motion according to one embodiment.

FIG. 2—Method for Detecting Local Motion

FIG. 2 is a flowchart diagram illustrating a method for detecting local motion between image frames in a series of image frames. The method may be performed within a camera, e.g., on the fly, by hardware (e.g., an FPGA or ASIC) or by software (e.g., a processor and memory medium). Alternatively, part or all of the method may be performed on an image (or image portion) by a different device, either in real time or at a later time, e.g., by a video codec or by a home computer with image processing hardware and/or software. In some embodiments, one of more of the steps described below may be skipped, repeated, or performed in a different order than shown, as desired.

In 202, a first image may be received. The first image may be an image frame that is part of a series of image frames, e.g., a temporally ordered series of video image frames. The first image may include a plurality of pixels, each of which may have a pixel value. In some embodiments, the pixels (and accordingly, the pixel values) may represent different colors; for example, the pixels may be laid out in a Bayer pattern, an RGBE pattern, a CYGM pattern, or any other color pattern; alternatively, in some embodiments the image may be monochromatic, e.g., the pixels may all represent the same color. In some embodiments, each pixel may have multiple values, e.g., luminance and chrominance values, and/or may have values representing multiple colors. The first image frame may be received by an input for receiving image frames. The input may be within a camera, e.g. if the method is being performed within a camera which captured the image. For example, the input may receive the first image frame from the image capturing portion of the camera. Alternatively, the first image frame may be received by a discrete device configured to perform the method described herein, and the input may be part of the device. In this case, the input may receive the first image frame from the camera which captured the image or from some other (e.g., an intermediate) device.

In 204, a second image may be received. The second image may, like the first image, be an image frame in a series of image frames. The first and second image frames may thus be similar or identical types of images, e.g., may each have the same number of pixels, the same dimensions, the same color filter array, etc. The second image frame may be later in time than the first image frame; that is, the second image frame may have been captured at a later time than the first image frame. The first and second image frames may be proximate in time. In some embodiments, the first and second image frames may be temporally adjacent, e.g., may be sequential image frames in the series of image frames, although in other embodiments, it may not be necessary that the first and second image frames be strictly temporally adjacent. The second image frame may be received after, at the same time, or even before the first image frame; it will thus be noted that when it is said that the second image frame is later in time than the first image frame, this may refer only to relative temporal location in the series of image frames, and need not refer to an order in which the image frames are received.

In 206, values of a first plurality of pixels at first pixel locations of the first image frame may be read. The first plurality of pixels may be a subset of the pixels in the first image frame. In some embodiments, the first plurality of pixels may include a first pixel and those pixels in a local area centered around the first pixel. The size of the local area centered around the first pixel may be smaller or larger, as desired. As will be described further below with respect to step 210, the method may involve statistical calculations, and thus the optimal size of the local area may, in some embodiments, depend on the desired balance between a less computationally intensive smaller local area and a more statistically significant larger local area.

In 208, values of a second plurality of pixels at second pixel locations of the second image frame may be read. The second plurality of pixels may be a subset of the pixels in the second image frame. Like the first plurality of pixels, the second plurality of pixels may include a second pixel and those pixels in a local area centered around the second pixel. Indeed, the first pixel locations of the first image frame may correspond to the second pixel locations of the second image frame. In other words, the first and second pluralities of pixels may occupy spatially equivalent portions of the first and second image frames. Thus, if the first and second image frames are image frames in a series of image frames, and there is no local motion in the area represented by the first and second pluralities of pixels between the image frames, one would expect corresponding pixels in the first and second pluralities of pixels to have identical or very nearly identical values.

In 210, a first delta function may be calculated to produce a first output. The first delta function may be based on differences between pixel values of corresponding pixel locations of the first plurality of pixels in the first image frame and the second plurality of pixels in the second image frame. In other words, the first delta function may produce a measure of the difference between the first image frame and the second image frame in the local area of the first and second pluralities of pixels. For example, in one embodiment, the first delta function may be a sum of signed deltas between values of spatially corresponding pixels in the first and second pluralities of pixels. In other words, each individual delta may be the (signed) difference between values of each spatially corresponding pair of pixels. The first delta function might then be the sum of the individual deltas for the pixels in the first and second pluralities of pixels. If the individual deltas are signed values, a sum of deltas produced by random noise will statistically tend toward zero. However, if there are real changes in the scene being depicted between the two image frames, the sum of individual delta values is likely to produce a non-trivial (positive or negative) value. Further examples and description of delta functions are provided below with respect to FIGS. 3A and 3B. Although specific delta functions are described above and below with respect to FIGS. 3A and 3B, it should be noted that other delta functions are also contemplated.

In 212, the first output may be compared to a first one or more thresholds. The first one or more thresholds may provide a demarcation between trivial outputs of the first delta function, which should indicate that there is no local motion occurring between the first and second image frames, and non-trivial outputs of the first delta function, which should indicate that there is local motion occurring between the first and second image frames. The first one or more thresholds may be determined based on any of a variety of factors, in order to optimally provide this demarcation. For example, the first one or more thresholds will tend to increase in magnitude if the size of the local area (e.g., the first and second pluralities of pixels) increases, because the number of pixels contributing to the first delta function is larger. However, because the number of pixels is larger (e.g., more statistically significant), greater confidence (e.g. more weight) can be given to the determination of whether or not the output of the first delta is considered trivial.

Another factor that may be considered in determining the first one or more thresholds may be the intensity or brightness of the local area. This may be desirable in some embodiments because the magnitude of noise may have a positive correlation with the strength of the signal—for example, the noise may be proportional to the strength of the signal, or may otherwise be related in such a way where the noise magnitude typically increases with signal strength. Because of this, dark areas may be expected to have smaller frame-to-frame pixel deltas than bright areas. Accordingly, it may be desirable to implement lower thresholds for darker areas than for brighter areas.

Thus, in some embodiments, a measure of the local intensity may be used in determining the first one or more thresholds. In a particular set of embodiments, a measure of the local intensity may be taken and compared to one or more intensity thresholds, which may be used to determine the first one or more thresholds. The intensity calculation may use the entire first and/or second plurality of pixels (e.g., the same area used for the first delta function calculation), or may use a subset or superset of that area. The intensity calculation may be an average luma calculation, or a simple average of pixel values, or any other measure of intensity, as desired. Further examples and description of how an intensity level may be used to determine the first one or more thresholds are provided below with respect to FIG. 4.

The first one or more thresholds may also or instead be based on other factors. For example, the gain settings of the sensor that captures the first and second image frames may affect the optimal first threshold(s); in some embodiments, noise levels will typically increase with the gain of the sensor. Other factors (e.g., other system components that may affect the intensity of pixel values before the method described herein is implemented) may also be used to determine the optimal first one or more thresholds.

In 214, it may be determined if local motion has occurred in the second image frame. The determination may be made based on the comparison of the first output to the first one or more thresholds. For example, if the first output is greater than a first threshold (e.g., if there is only one first threshold), it may be determined that local motion has occurred in the second image frame, while if the first output is not greater than the first threshold, it may be determined that local motion has not occurred in the second image frame.

As described above, in some embodiments the output of the first delta function may be a signed value. For example, if the first delta function is a sum of individual signed deltas, the output will also be a signed value. In this case the absolute value of the output may be compared with a first threshold, or the signed value may be compared with positive and negative first threshold values. For example, if the output of the first delta function is between the negative and positive threshold values, it may be determined that no local motion has occurred between the first and second image frames, while if the output of the first delta function is greater than the positive threshold value or less than the negative threshold value, it may be determined that local motion has occurred in the second image frame.

In some embodiments, the determination of whether local motion has occurred may be used as part of a decision as to whether or not to apply a temporal filter to one or more pixels in the local area. Because applying a temporal filter to a pixel whose value is changing due to real changes in the scene depicted could result in undesirable artifacts (e.g., ghosting, or blurring), it may be desirable to use the method for detecting local motion between image frames to determine whether or not to apply a temporal filter to the pixels of each image frame. In addition to such a temporal filtering application, other uses of the method for detecting local motion between image frames will be apparent to those skilled in the art, and are also contemplated.

As noted above, the local area (e.g., the area represented by the first and second pluralities of pixels) may include a central pixel (e.g., the first pixel in the first image frame and the second pixel in the second image frame) and pixels in a local area centered around the central pixel. In one set of embodiments, if local motion is not detected in the second image frame, a temporal filter may be applied to the second pixel, while if local motion is detected in the second image frame, a temporal filter may not be applied to the second pixel. In this particular set of embodiments, separate determinations of local motion may be made for each of the pixels surrounding the central pixel, e.g., using different local areas, where each local area is centered around the pixel in question.

In some embodiments, a history of local motion for the central pixel of the local area may also be used in determining whether local motion has occurred in the second image frame. For example, whether local motion has been detected between one or more (temporally proximate, e.g., temporally adjacent) pairs of previous image frames for the local area of the central pixel may be used to determine whether local motion has occurred in the second image frame. Using the history of recent motion detection for a given pixel location may allow the decision as to whether there is local area motion to be more aggressive. For example, if the comparison of the delta function to the first one or more thresholds indicates that there is not local motion, but the history of the central pixel indicates that there was local motion in one or more previous image frames, local motion may still be determined to have occurred. This may reduce the possibility of filtering motion (e.g., in a temporal filtering application of the local motion detection) or making some other decision based on motion detection. In other words, a "buffer safety zone" may be created by the local motion history, e.g., to prevent filtering around recent motion.

As an example, consider a case in which the trailing edge of a moving object is moving out of the local area. As the object moves out of the window being used to calculate the first delta function, the output could be expected to trail off since fewer pixels of the object would be within the window to contribute to the output of the first delta function. In this case, using the history may prevent filtering too soon after the object has passed. In some embodiments, multiple frames of motion history can be used, and a mask may be applied to decide which additional frames of history should be included in a filtering (or other) decision. In some embodiments, only 1 bit of memory may be needed per pixel for each frame back in time for which motion history is maintained. This more aggressive "flagging" of local area motion may similarly help prevent missing local area motion for a greater range of scene textures.

In some embodiments, a history of local motion for one or more neighboring pixels to the central pixel of the first and/or second pluralities of pixels may also be used in determining whether local motion has occurred in the second image frame. For example, much as records of previous motion detection may be stored and used for the local area of the central pixel, records of previous motion detection may also be stored and used for local areas of pixels near the central pixel. Using the histories of such nearby pixels may provide many of the same benefits as utilizing the history of local motion of the central pixel of the local area. This may also expand the "buffer safety zone" around any recently "flagged" motion. In addition, this may add a limited ability to predict future local area motion for the central pixel. For example, if local area motion was detected in the previous frame for a pixel a distance of 2 pixels away from the central pixel, this could be the result of motion approaching the central pixel or receding from the central pixel.

Many of the above described embodiments involve using a first window, e.g., including pixels in a local area of a first image frame and pixels in a spatially corresponding local area of a second image frame, to determine if local motion has occurred. In some embodiments, it may be desirable to use multiple windows, and to calculate delta functions for each window. For example, in some embodiments, there may be a first window, including the first/second pluralities of pixels, e.g., the first/second pixel and those pixels in an area centered around the first/second pixel, and an additional window, which might include third and fourth pluralities of pixels which may be subsets of those pixels in the first/second pluralities of pixels. Additional windows, including other subsets of the first/second pluralities of pixels, might also be used.

Alternatively, multiple windows, of which none is a subset of any other, may be used, if desired. For example, multiple partially- or non-overlapping windows may be used. Further description of embodiments utilizing multiple windows is provided below with respect to FIGS. 3A and 3B.

Figure 3A:
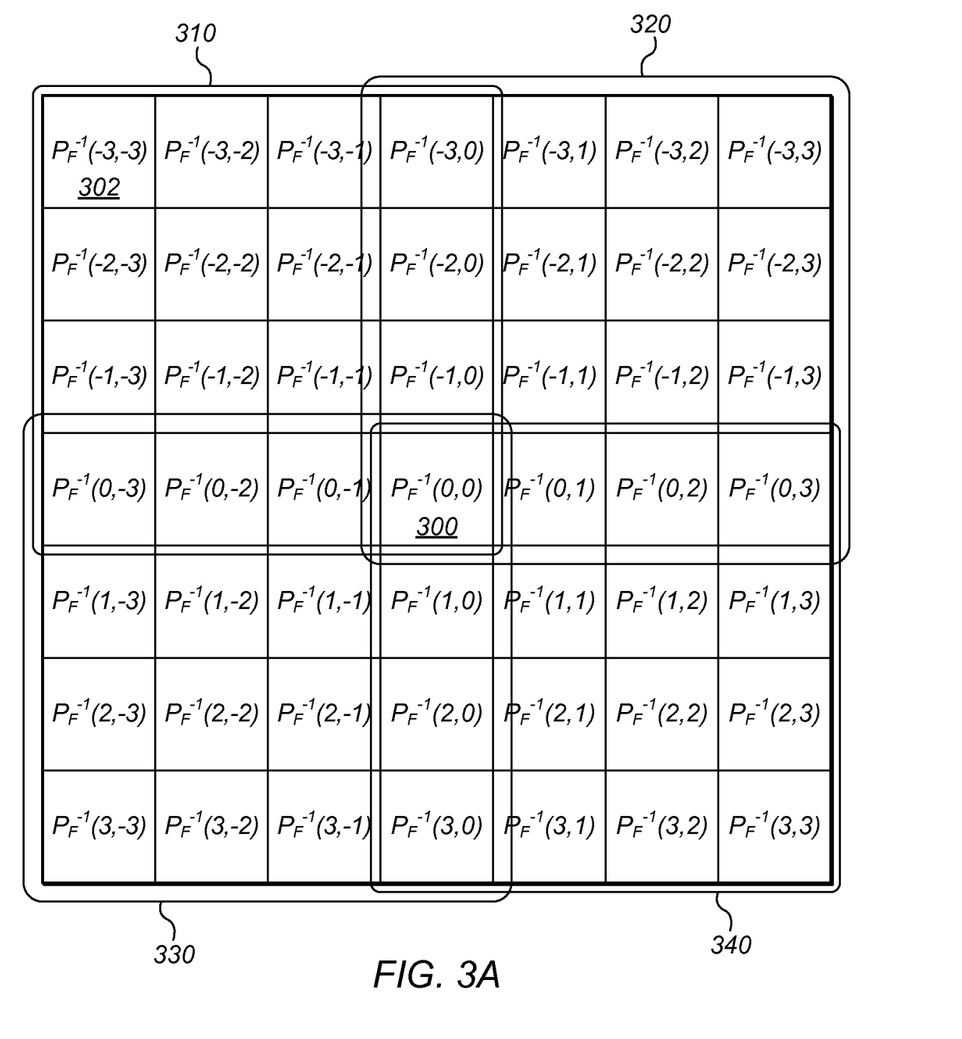
FIGS. 3A and 3B are grids representing image frame portions according to one embodiment.
Figure 3B:
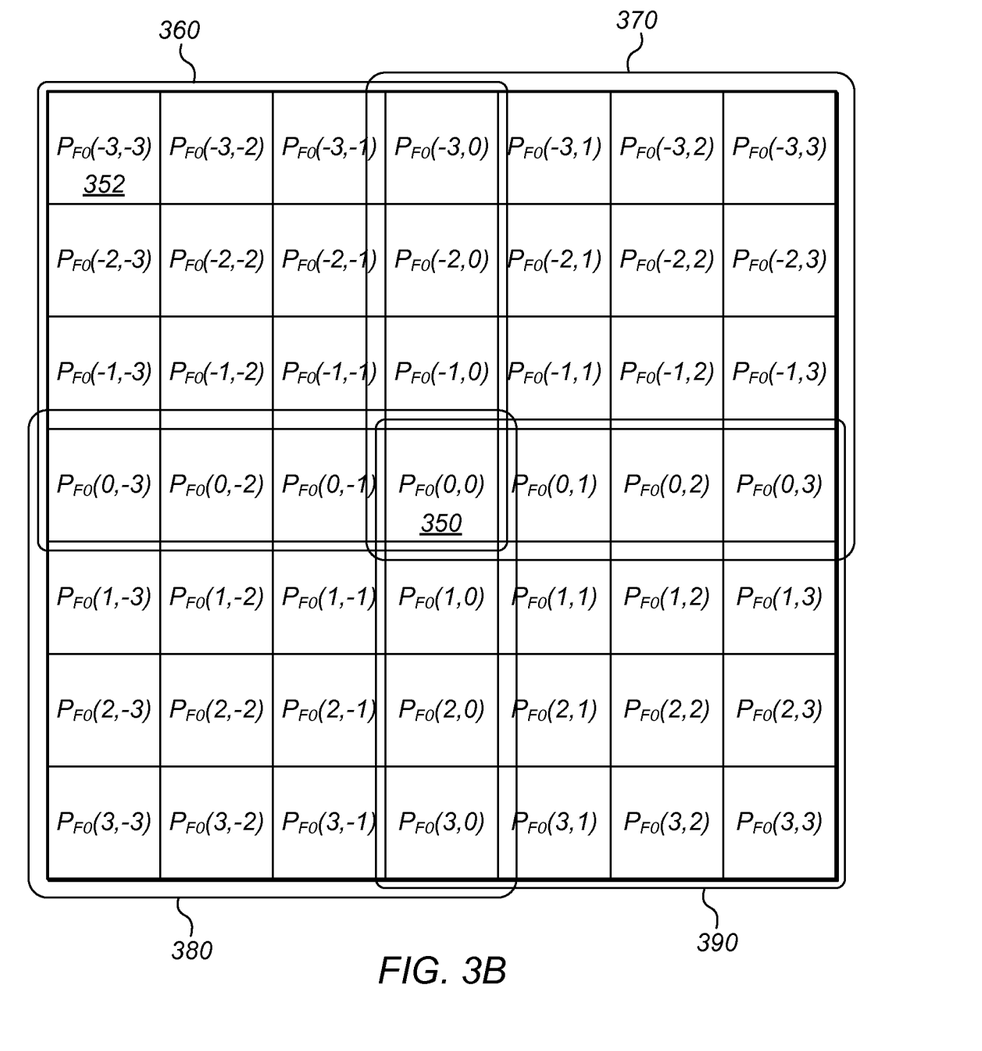

FIGS. 3A and 3B—Grids Representing Image Frame Portions

FIGS. 3A and 3B represent exemplary portions of two image frames according to one embodiment. In some embodiments, image frame portions such as those shown in FIGS. 3A and 3B may used to detect local motion between image frames, as described above with respect to FIG. 2. For example, FIG. 3A may represent a portion of a first image frame centered around a first pixel 300, and FIG. 3B may represent a portion of a second image frame centered around a second pixel 350.

For clarity in describing the figures, each square in FIGS. 3A and 3B has been labeled using a coordinate system in which the first and second pixels are used as the origins. Thus, each square is referred to as $P_F^X(M,N)$, where P indicates that the square represents a pixel, $F^X$ indicates that the pixel is in the Xth frame, and (M,N) indicates coordinates of the pixel relative to the central (e.g., first or second) pixel in the local area. It will be noted that this labeling system is exemplary only, and is not intended to be limiting.

FIGS. 3A and 3B show frame portions of 7×7 pixel areas. The first pixel 300 in the first frame may be in a location of the first image frame that corresponds spatially to the location of the second pixel 350 in the second frame, and the surrounding pixels may similarly be in corresponding spatial locations between the frames. Thus, the frame portions shown in FIGS. 3A and 3B might correspond to the first and second pluralities of pixels described above with respect to FIG. 2. For example, a delta function could be calculated between the frame portions shown in FIGS. 3A and 3B. As described above, the delta function could utilize individual pixel deltas. For example, the delta function between first pixel 300 and second pixel 350 might be:

$$\Delta(0,0)=P_F^0(0,0)-P_F^{-1}(0,0) \tag{1}$$

Individual deltas of other pixel locations could be similarly calculated, e.g., the delta between upper left corner pixels 302 and 352 might be:

$$\Delta(-3,-3)=P_F^0(-3,-3)-P_F^{-1}(-3,-3) \tag{2}$$

Thus, the sum of all such individual delta functions in the local area might be:

$$\Delta_{Total} = \sum_{i=-3}^{i=3} \sum_{j=-3}^{j=3} [P_{F^0}(i, j) - P_{F^{-1}}(i, j)] \quad (3)$$

It will readily be recognized that other delta functions are also possible; the delta functions presented above are intended for illustrative purposes and should not be considered limiting.

As noted above with respect to FIG. 2, the method described herein may also utilize multiple windows in some embodiments. For example, in some embodiments, there may be a main window (such as the entire 7×7 window shown in FIGS. 3A and 3B) and one or more subsets of the main window (such as one or more of overlapping windows 310/360, 320/370, 330/380, and/or 340/390). Alternatively, multiple partial- or non-overlapping windows may be used, e.g., where none of the windows is a subset of any of the other windows. Different delta functions may be used for different windows. For example, the following functions might be used for the overlapping subsets of the main window shown in FIGS. 3A and 3B:

$$\Delta_{310/360} = \sum_{i=-3}^{i=0} \sum_{j=-3}^{j=0} [P_{F^0}(i, j) - P_{F^{-1}}(i, j)] \quad (4)$$

$$\Delta_{320/370} = \sum_{i=-3}^{i=0} \sum_{j=0}^{j=3} [P_{F^0}(i, j) - P_{F^{-1}}(i, j)] \quad (5)$$

$$\Delta_{330/380} = \sum_{i=0}^{i=3} \sum_{j=-3}^{j=0} [P_{F^0}(i, j) - P_{F^{-1}}(i, j)] \quad (6)$$

$$\Delta_{340/390} = \sum_{i=0}^{i=3} \sum_{j=0}^{j=3} [P_{F^0}(i, j) - P_{F^{-1}}(i, j)] \quad (7)$$

It should be noted that any number and size of windows may be used as part of the local motion detection algorithm, as desired. For example, in some embodiments, a 9×9 window could be used, along with nine 3×3 subset windows; in other embodiments, any number of other window arrangements may be used.

If multiple local area windows are used, each window may have its own delta function, as noted above. In addition, each window may have its own threshold(s) with which the output of its delta function may be compared. In some embodiments, a measure of the intensity of each window may also be calculated, which may accordingly be used in determining the threshold(s) for each window. This may be performed for each window in much the same way as described above with respect to FIG. 2. For example, a function may be used that produces one or more thresholds based on a calculated intensity, and/or a set of intensity levels and corresponding thresholds may be used to determine the threshold(s) for each window. The threshold(s) used for comparison with the delta function for each window may thus be different, e.g., depending on differing intensities of different windows, and/or other differences between windows, such as how many pixels are in each window, and/or other characteristics of the sensor and other system elements. It should be noted that the differences between thresholds between different sized windows may be based both on the statistical significance of the size of the window and on the proportional relationship between number of pixels in a window and amount of motion which should be required to determine that motion has occurred. In addition, further weighting factors may be applied for any windows whose center is not the "central pixel" (e.g., the first or second pixel), that is, the pixel for whose local area it is being determined if motion has occurred.

Utilizing multiple windows in determining if local motion has occurred may have several advantages. For example, a larger window may be ideal for gathering the most statistically significant frame-to-frame delta sum information. Smaller windows may be helpful in facilitating detection of motion involving textures or a greater level of detail which the larger window may miss. For example, a line segment that moves within the larger window, with no part leaving it, will not contribute to a larger delta sum. However, if the same line segment passes from one of the smaller windows to the next, the smaller windows could potentially detect the motion.

Figure 4:
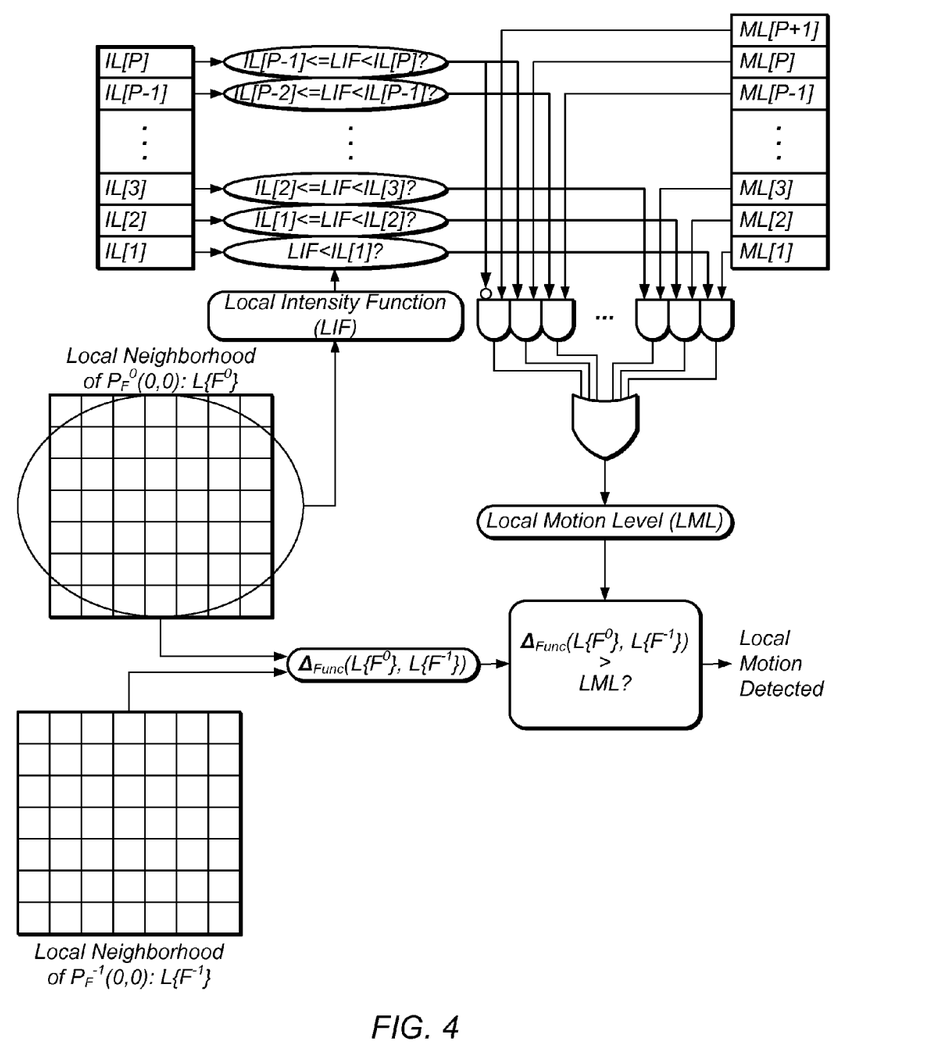
FIG. 4 is a diagram visually illustrating a method for detecting local motion according to one embodiment.

FIG. 4—Diagram Visually Illustrating a Method for Detecting Local Motion

FIG. 4 is a diagram visually illustrating a method for detecting local motion according to one embodiment. It should be noted that these embodiments are exemplary only, and any other means or manners of implementing the method of FIG. 2, in addition to or in place of those described below with respect to FIG. 4, are also possible.

As shown, values of pixels in the local areas (e.g., $L\{F^{-1}\}$, $L\{F^0\}$) of a first pixel (e.g., $P_F^{-1}(0,0)$) and a second pixel (e.g., $P_F^0(0,0)$) in first and second image frames may be used to calculate a delta function (e.g., $\Delta_{Func}(L\{F^0\}, L\{F^{-1}\})$). Values of pixels in the local area of the second pixel (e.g., $L\{F^0\}$) may also be used to calculate a local intensity function (LIF). A set of intensity level thresholds (e.g., P intensity levels) may be used to define a set of intensity level ranges (e.g., P+1 intensity ranges). The LIF may be compared to one or more of the intensity level thresholds in order to determine in which range of intensity it belongs. Each intensity range may correspond to a motion level (e.g., there may be P+1 motion levels). The motion level corresponding to the intensity level of the LIF may thus be used as a local motion level (LML). The LML may be used as a threshold for determining if local area motion has occurred; for example, as shown, it may be determined that local motion has occurred if the result of the delta function is greater than the LML.

The method described herein provides several advantages and other noteworthy features. One advantage of the method is that it may be implemented "on the fly", e.g., as images are being captured, with great potential for high accuracy in local motion detection. In addition, the mathematical complexity of the algorithm can be limited to simple fixed-point signed arithmetic and relational signed comparisons, if desired. This may allow for a simpler hardware design, if so desired, which in turn may result in a smaller, more efficient, and less expensive implementation.

It is also worth noting that the method may potentially require storage of pixel values from a previous image frame. In other words, in order for the algorithm to be implemented, it may be necessary that pixel values from two image frames be simultaneously available. The number of pixels involved in the calculation(s) (e.g., the delta function(s)) may also potentially be high (e.g., as the method may work better with a more statistically significant sample of pixel values) in some embodiments.

Additionally, it should be noted that the algorithm may not distinguish between motion and other sources of actual changes in the scene being depicted, such as turning on a light. In other words, non-moving surfaces with a change of light intensity may still be interpreted as having undergone motion. Depending on the application of the local motion detection, this may or may not desirable. For example, with respect to making a decision as to whether to apply a temporal filter, it may be desirable that any frame-to-frame changes in pixel values which are representative of the actual scene being depicted be detected. Thus in that case, no problem is presented; however, in other applications, such a distinction may be of importance, and thus should be noted.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for detecting local motion in a series of image frames, wherein each image frame comprises a plurality of pixels, the method comprising:
   receiving a first image frame and a second image frame in the series of image frames, wherein the second image frame is later in time relative to the first image frame;
   reading values of a first plurality of pixels at first pixel locations of the first image frame, wherein the first plurality of pixels is a subset of the plurality of pixels in the first image frame;
   reading values of a second plurality of pixels at second pixel locations of the second image frame, wherein the second plurality of pixels is a subset of the plurality of pixels in the second image frame, wherein the first pixel locations of the first image frame correspond to the second pixel locations of the second image frame;
   calculating a first delta function to produce a first output, the first delta function comprising a sum of differences between pixel values of corresponding pixel locations of the first plurality of pixels in the first image frame and the second plurality of pixels in the second image frame;
   comparing the first output to a first one or more thresholds,
   determining if local motion has occurred in the second image frame based on said comparing.

2. The method of claim 1, further comprising:
   calculating an intensity of pixel values using pixel values of at least a subset of the second plurality of pixels of the second image frame;
   determining the first one or more thresholds based on the calculated intensity of pixel values.

3. The method of claim 2,
   wherein the calculated intensity of pixel values is an average intensity of the at least a subset of the second plurality of pixels.

4. The method of claim 2, wherein determining the first one or more thresholds comprises:
   comparing the calculated intensity of pixel values to a plurality of predetermined intensity levels, thereby determining an intensity level range of the at least a subset of the second plurality of pixels of the second image frame, wherein each of the plurality of predetermined intensity level ranges corresponds to one or more predetermined thresholds;
   determining the first one or more thresholds based on said comparing, wherein the first one or more thresholds correspond to the determined intensity level range.

5. The method of claim 1,
   wherein the first one or more thresholds are variable based on a gain of a sensor, wherein the sensor is used to capture the series of image frames.

6. The method of claim 1,
   wherein the series of image frames comprise a temporally ordered series of video image frames, wherein the first image frame and the second image frame are temporally adjacent in the series of image frames.

7. The method of claim 1,
   wherein the second plurality of pixels comprise a first pixel and pixels in a local area centered around the first pixel, wherein said determining if local motion has occurred in the second image frame comprises determining if motion has occurred in the local area of the first pixel.

8. The method of claim 1, further comprising:
   reading values of a third plurality of pixels of the first image frame;
   reading values of a fourth plurality of pixels of the second image frame, wherein the third pixel locations of the first image frame correspond to the fourth pixel locations of the second image frame;
   calculating a second delta function to produce a second output, the second delta function comprising a sum of differences between pixel values of corresponding pixel locations of the third plurality of pixels in the first image frame and the fourth plurality of pixels in the second image frame;
   comparing the second output to a second one or more thresholds;
   wherein said determining if local motion has occurred in the second image frame is based on both comparing the output of the first delta function to the first one or more thresholds and comparing the output of the second delta function to the second one or more thresholds.

9. The method of claim 8,
   wherein the third plurality of pixels is a subset of the first plurality of pixels, wherein the fourth plurality of pixels is a subset of the second plurality of pixels.

10. The method of claim 1, further comprising:
    receiving a third image frame in the series of image frames, wherein the third image frame is later in time relative to the first and second image frames;
    reading values of a third plurality of pixels of the third image frame;
    calculating the first delta function to produce a second output using differences between pixel values of corresponding pixel locations in the second plurality of pixels in the second image frame and the third plurality of pixels in the third image frame;
    comparing the second output to a second one or more thresholds,
    determining if local motion has occurred in the third image frame based on said comparing and based on said determining if local motion has occurred in the second image frame.

11. The method of claim 1,
    wherein said determining if local motion has occurred in the second image frame is also based on whether local motion has occurred in corresponding pixel locations of one or more previous image frames proximate in time to the second image frame.

12. A system for detecting local motion in a series of image frames, wherein each image frame comprises a plurality of pixels, the system comprising:
    an input for receiving image frames;
    logic for detecting local motion, wherein the logic is configured to:
       receive, via the input, a first image frame and a second image frame in the series of image frames, wherein the second image frame is later in time relative to the first image frame;

read values of a first plurality of pixels at first pixel locations of the first image frame, wherein the first plurality of pixels is a subset of the plurality of pixels in the first image frame;

read values of a second plurality of pixels at second pixel locations of the second image frame, wherein the second plurality of pixels is a subset of the plurality of pixels in the second image frame, wherein the first pixel locations of the first image frame correspond to the second pixel locations of the second image frame;

calculate a first delta function to produce a first output, the first delta function comprising a sum of differences between pixel values of corresponding pixel locations of the first plurality of pixels in the first image frame and the second plurality of pixels in the second image frame;

compare the first output to a first one or more thresholds, determine if local motion has occurred in the second image frame based on said comparing.

13. The system of claim 12, wherein the logic is further configured to:

calculate an intensity of pixel values using pixel values of at least a subset of the second plurality of pixels of the second image frame;

determine the first one or more thresholds based on the calculated intensity of pixel values.

14. The system of claim 13, wherein the calculated intensity of pixel values is an average intensity of the at least a subset of the second plurality of pixels.

15. The system of claim 13, the logic configured to determine the first one or more thresholds is configured to:

compare the calculated intensity of pixel values to a plurality of predetermined intensity levels, thereby determining an intensity level range of the at least a subset of the second plurality of pixels of the second image frame, wherein each of the plurality of predetermined intensity level ranges corresponds to one or more predetermined thresholds;

determine the first one or more thresholds based on said comparing, wherein the first one or more thresholds correspond to the determined intensity level range.

16. The system of claim 12, wherein the first one or more thresholds are variable based on a gain of a sensor, wherein the sensor is used to capture the series of image frames.

17. The system of claim 12, wherein the series of image frames comprise a temporally ordered series of video image frames, wherein the first image frame and the second image frame are temporally adjacent in the series of image frames.

18. The system of claim 12, wherein the second plurality of pixels comprise a first pixel and pixels in a local area centered around the first pixel, wherein said determining if local motion has occurred in the second image frame comprises determining if motion has occurred in the local area of the first pixel.

19. The system of claim 12, wherein the logic is further configured to:

read values of a third plurality of pixels of the first image frame;

read values of a fourth plurality of pixels of the second image frame, wherein the third pixel locations of the first image frame correspond to the fourth pixel locations of the second image frame;

calculate a second delta function to produce a second output, the second delta function comprising a sum of differences between pixel values of corresponding pixel locations of the third plurality of pixels in the first image frame and the fourth plurality of pixels in the second image frame;

compare the second output to a second one or more thresholds;

wherein said determining if local motion has occurred in the second image frame is based on both comparing the output of the first delta function to the first one or more thresholds and comparing the output of the second delta function to the second one or more thresholds.

20. The system of claim 19, wherein the third plurality of pixels is a subset of the first plurality of pixels, wherein the fourth plurality of pixels is a subset of the second plurality of pixels.

21. The system of claim 12, wherein the logic is further configured to:

receive a third image frame in the series of image frames, wherein the third image frame is later in time relative to the first and second image frames;

read values of a third plurality of pixels of a third image frame;

calculate the first delta function to produce a second output using differences between pixel values of corresponding pixel locations in the second plurality of pixels in the second image frame and the a third plurality of pixels in the third image frame;

compare the second output to a second one or more thresholds, determine if local motion has occurred in the third image frame based on said comparing and based on said determining if local motion has occurred in the second image frame.

22. The system of claim 12, wherein said determining if local motion has occurred in the second image frame is also based on whether local motion has occurred in corresponding pixel locations of one or more previous image frames proximate in time to the second image frame.

23. The method of claim 1, the method further comprising:

performing temporal filtering on at least one pixel of the second plurality of pixels if it is determined that local motion has not occurred in a vicinity of the at least one pixel.

24. The system of claim 12, wherein the logic is further configured to:

perform temporal filtering on at least one pixel of the second plurality of pixels if it is determined that local motion has not occurred in a vicinity of the at least one pixel.

* * * * *